United States Patent
Wang et al.

(10) Patent No.: US 11,923,140 B2
(45) Date of Patent: Mar. 5, 2024

(54) CARBON-METAL OXIDE COMPOSITE ELECTRODE FOR A SUPERCAPACITOR AND METHOD OF MAKING A CARBON-METAL OXIDE COMPOSITE ELECTRODE

(71) Applicant: The Board of Trustees of the University of Illinois, Urbana, IL (US)

(72) Inventors: Gang Wang, Urbana, IL (US); Yaofeng Chen, Chicago, IL (US); Joseph W. Lyding, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/224,450

(22) Filed: Apr. 7, 2021

(65) Prior Publication Data
US 2021/0319958 A1    Oct. 14, 2021

Related U.S. Application Data (60) Provisional application No. 63/007,023, filed on Apr. 8, 2020.

(51) Int. Cl.
*H01G 11/32* (2013.01)
*D01D 5/06* (2006.01)
(Continued)

(52) U.S. Cl.
CPC .............. *H01G 11/32* (2013.01); *D01D 5/06* (2013.01); *H01G 11/46* (2013.01); *H01G 11/56* (2013.01); *H01G 11/86* (2013.01); *B33Y 10/00* (2014.12)

(58) Field of Classification Search
CPC .............................. H01G 11/46; H01G 11/32
See application file for complete search history.

(56) References Cited

U.S. PATENT DOCUMENTS 7,623,340 B1    11/2009  Song et al.
8,120,892 B2     2/2012  Kim et al.
(Continued)

FOREIGN PATENT DOCUMENTS

CN    101399120 A  *  4/2009
CN    101577180 A  * 11/2009
(Continued)

OTHER PUBLICATIONS

Zheng et al.., "Comprehensive approaches to three-dimensional flexible supercapacitor electrodes based on MnO2/carbon nanotube/activated carbon fiber felt", J. MaterSci (2017) 52:5788-5798 (Year: 2017).*

(Continued)

*Primary Examiner* — Eric W Thomas
(74) *Attorney, Agent, or Firm* — Crowell & Moring LLP (57) ABSTRACT

A method of making a carbon-metal oxide composite electrode for a supercapacitor includes continuously injecting a carbon material solution into a coagulation solution, where the carbon material solution comprises a carbon source and a liquid, and the coagulation solution comprises a metal nitrate or chloride and an organic solvent. An extruded structure comprising the metal nitrate or chloride interspersed with carbon is formed from the continuous injection. The extruded structure is annealed under conditions sufficient to convert the metal nitrate or chloride to metal oxide. Thus, a composite structure comprising the metal oxide and the carbon is formed, where the metal oxide is uniformly dispersed within the composite structure.

5 Claims, 11 Drawing Sheets (51) Int. Cl.
*H01G 11/46* (2013.01)
*H01G 11/56* (2013.01)
*H01G 11/86* (2013.01)
*B33Y 10/00* (2015.01)

(56) References Cited

U.S. PATENT DOCUMENTS

| | | | |
|---|---|---|---|
| 8,254,086 B2 | 8/2012 | Mastro et al. | |
| 9,406,449 B2 | 8/2016 | Xie et al. | |
| 2011/0304955 A1* | 12/2011 | Zhou | H01G 11/86 977/788 |
| 2012/0295027 A1 | 11/2012 | Liu et al. | |
| 2016/0260549 A1* | 9/2016 | Chen | H01G 11/46 |
| 2018/0297850 A1 | 10/2018 | Tour et al. | |

FOREIGN PATENT DOCUMENTS

| | | | |
|---|---|---|---|
| CN | 106098410 A * | 11/2016 | |
| CN | 110379642 A * | 10/2019 | D01F 1/10 |
| KR | 100675923 | 1/2007 | |
| KR | 101570983 B1 * | 11/2015 | |
| KR | 20160084171 A * | 7/2016 | |
| WO | WO 2014/078423 A1 | 5/2014 | |

OTHER PUBLICATIONS

Zhao et al., "A novel hybrid supercapacitor with a carbon nanotube cathode and an iron oxide/carbon nanotube composite anode", J. Mater. Chem., (2009), 19, 8755-8760 (Year: 2009).*
Zheng et al., "Preparation and electrochemical properties of multiwalled carbon nanotubes-nickel oxide porous composite for supercapacitors", Materials Research Bulletin, 42, (2007) 1740-1747 (Year: 2007).*
Chang et al., "Asymmetric Supercapacitors Based on Graphene/ MnO 2Nanospheres and Graphene/MoO 3 Nanosheets with High Energy Density", Adv. Funct. Mater. 2013, 23, 5074-5083 (Year: 2013).*
Yassine et al., "Performance of Commercially Available Supercapictors," *Energies*, 10, 1340 (2017) pp. 1-12.

* cited by examiner

CARBON-METAL OXIDE COMPOSITE ELECTRODE FOR A SUPERCAPACITOR AND METHOD OF MAKING A CARBON-METAL OXIDE COMPOSITE ELECTRODE

RELATED APPLICATION

The present patent document claims the benefit of priority under 35 U.S.C. § 119(e) to U.S. Provisional Patent Application No. 63/007,023, which was filed on Apr. 8, 2020, and is hereby incorporated by reference in its entirety.

FEDERALLY SPONSORED RESEARCH OR DEVELOPMENT

This invention was made with government support under grant number EEC 1449548 awarded by the National Science Foundation. The government has certain rights in the invention.

TECHNICAL FIELD

The present disclosure is related generally to energy storage technology and more particularly to a composite electrode for a high performance supercapacitor.

BACKGROUND

Batteries and supercapacitors represent two complementary electrochemical energy storage technologies. Supercapacitors may exhibit a high power density and long life cycle. Commercially, supercapacitors have already found application in, for example, electric vehicles, electric ships, and electrical grids. However, commercial supercapacitors tend to be bulky and heavy since they typically have a low specific capacitance and low energy density, due at least in part to the electrode materials employed. Hence, there is great interest in creating new electrode materials to increase the specific capacitance and energy density of supercapacitors.

In addition, rapid advances in various flexible and stretchable materials have boosted growth of unconventional electronic devices for wearable and flexible applications, such as stretchable transistors, artificial skin sensors and implantable devices. High-performance energy storage materials with robust mechanical properties are sought after to meet the growing demands of these unconventional electronics, which are powered by electricity. Supercapacitors capable of deforming and stretching without loss of performance have great potential in wearable and flexible electronics.

BRIEF SUMMARY

A carbon-metal oxide composite electrode for a supercapacitor and a method of making the carbon-metal oxide composite electrode are described in this disclosure. Also described is a supercapacitor assembled using the carbon-metal oxide composite electrode.

The carbon-metal oxide composite electrode comprises a composite structure including carbon and a metal oxide, where the metal oxide is uniformly dispersed within the composite structure.

A supercapacitor comprises first and second electrodes separated by a gel electrolyte, where at least one of the first and second electrodes comprises the carbon-metal oxide composite electrode. The supercapacitor may be flexible and/or stretchable.

The method of making the carbon-metal oxide composite electrode includes continuously injecting a carbon material solution into a coagulation solution, where the carbon material solution comprises a carbon source and a liquid, and the coagulation solution comprises a metal nitrate or chloride and an organic solvent. An extruded structure comprising the metal nitrate or chloride interspersed with carbon is formed from the continuous injection. The extruded structure is annealed under conditions sufficient to convert the metal nitrate or chloride to metal oxide. Thus, a composite structure comprising the metal oxide and the carbon is formed, where the metal oxide is uniformly dispersed within the composite structure.

BRIEF DESCRIPTION OF THE DRAWINGS

FIGS. 5A-5D are current-voltage (CV) curves of carbon-metal oxide composite electrodes in symmetric two-electrode solid state supercapacitor device, where FIG. 5A shows data for a CNT/MnO$_x$ electrode with alkaline electrolyte gel, FIG. 5B shows data for a CNT/MnO$_x$ electrode with acidic electrolyte gel, FIG. 5C shows data for a CNT/NiO$_x$ electrode with alkaline electrolyte gel, and FIG. 5D shows data for a CNT/CoO$_x$ electrode with alkaline electrolyte gel.

DETAILED DESCRIPTION

A new and facile method of fabricating carbon-metal oxide composite electrodes for high performance electrochemical supercapacitors has been developed. The fabrication method can be described as a simple two-step approach that first forms composite precursor fibers, ribbons or thin films in a solution-based extrusion process, as described below, and then yields, upon annealing, highly uniform carbon-metal oxide composite structures that may be used as supercapacitor electrodes. Advantageously, the metal oxide may be homogeneously distributed within the composite structure. In comparison with conventional supercapacitors, which may be bulky and heavy due to low specific capacitance and energy density, supercapacitors formed from the composite electrodes described in this disclosure may exhibit high values of specific capacitance and energy density at a reduced volume and weight. The mechanical properties of the composite electrodes may further enable the fabrication of flexible and/or stretchable supercapacitors. Advantageously, the fabrication method of the composite electrodes is continuous and scalable. Due to significantly improved properties and other advantages, supercapacitors formed from the composite electrodes may displace currently used supercapacitors and enable new applications, such as in electric aircraft.

Figure 1:
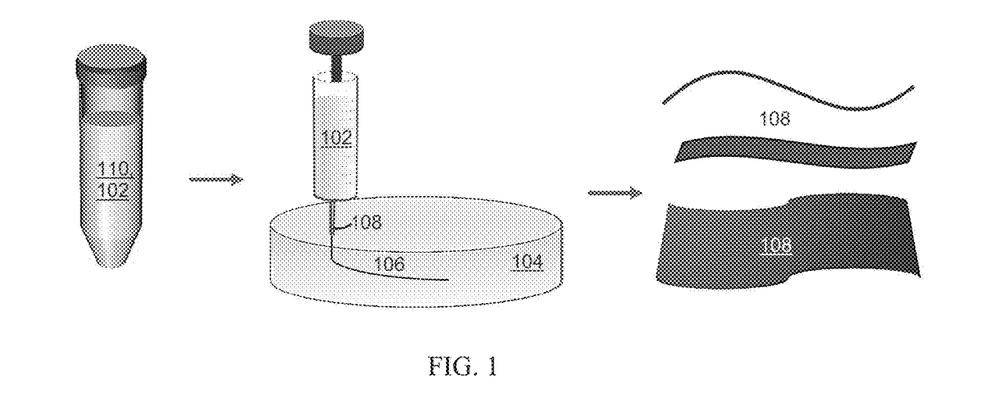
FIG. 1 is a schematic of an exemplary fabrication process.
Figure 2:
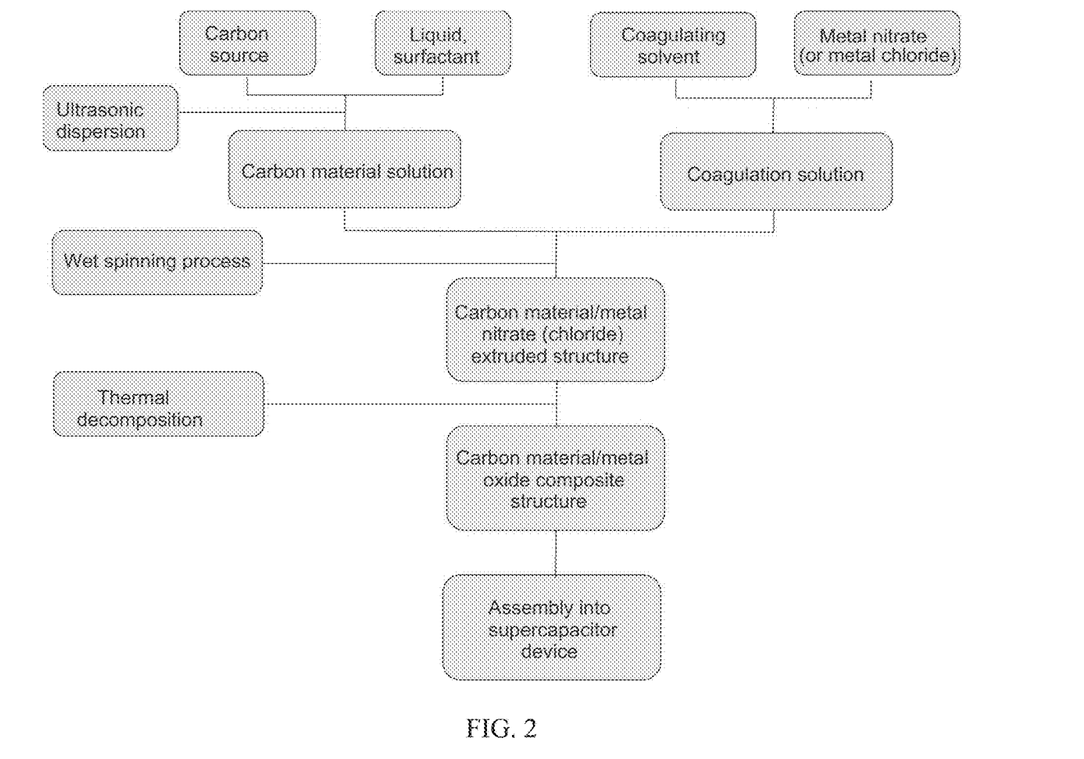
FIG. 2 is a flow chart showing exemplary steps in the fabrication process illustrated in FIG. 1.

FIG. 1 provides a schematic illustrating parts of the fabrication process, and FIG. 2 is a flow chart showing steps in the process. The method includes continuously injecting a carbon material solution 102 into a coagulation solution 104, where the carbon material solution 102 comprises a carbon source and a liquid, and where the coagulation solution 104 comprises a metal nitrate (or metal chloride) and an organic solvent. As shown in FIG. 1, a nozzle 108 submerged in the coagulation solution may be employed for the continuous injection, which may be described as wet spinning or 3D printing. The continuous injection yields an extruded structure 106 comprising the metal nitrate or chloride interspersed with carbon. After formation, the extruded structure 106 is annealed under conditions sufficient to convert the metal nitrate or chloride to metal oxide, such that a composite structure 108 comprising the metal oxide and the carbon is formed, where the metal oxide is uniformly dispersed within the composite structure 108. In some examples, the metal oxide takes the form of nanocrystals and/or is atomically distributed within the carbon. Evidence of the uniform dispersion is provided in FIG. 13, which is discussed below and shows a metal oxide homogeneously distributed in the carbon matrix of an exemplary composite structure.

The extruded structure 106 and the composite structure 108 formed upon annealing may have a shape influenced or determined by the cross-section of the nozzle 108 and/or by the rate of extrusion. Typically, the cross-section of the nozzle is circular, square, or rectangular. The extruded structure 106 and consequently the composite structure 108 may have the shape of a fiber, ribbon, or film, as illustrated in FIG. 1. (It is noted that, in description that may be applicable to both the extruded structure 106 and the composite structure 108, the term "extruded/composite structure 106,108" may be used for simplicity and may be understood to mean "extruded structure 106 and/or composite structure 108.") The rate of extrusion typically falls in a range from about 3 ml/hr to about 70 ml/hr. Because the process is continuous and may be carried out for an extended time duration, the length of the extruded/composite structure 106,108 may extend over tens of meters of length. Typically, the length of the extruded/composite structure 106,108 is in a range from about 500 microns to about 5 m. The extruded/composite structure 106,108 may also or alternatively comprise a thickness or diameter in a range from about 100 nm to about 500 microns, depending on the size of the nozzle. In the case of a film, the extruded/composite structure 106,108 may have a width determined by the size of the nozzle or by the collective width of extruded ribbons printed in side-to-side contact with each other.

Figure 18A:
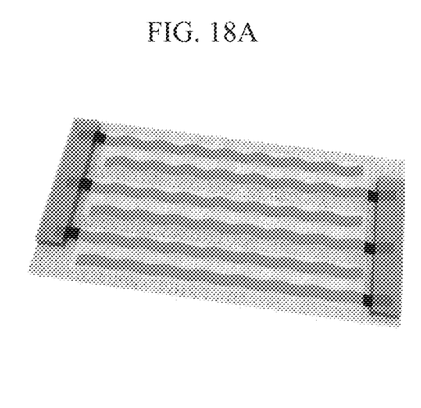
FIG. 18A is a schematic of carbon-metal oxide composite-based supercapacitors connected in parallel.
Figure 18B:
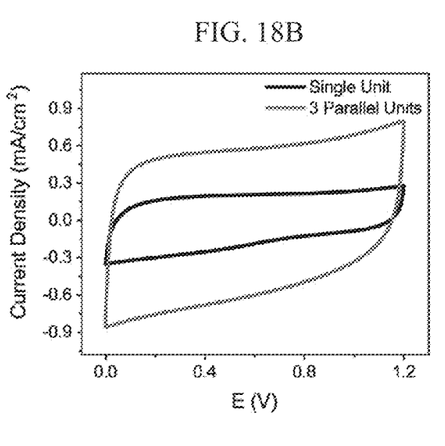
FIGS. 18B and 18C show CV curves and GCD curves, respectively, for three SWCNT/MnO$_2$-based supercapacitor units connected in parallel.
Figure 18C:
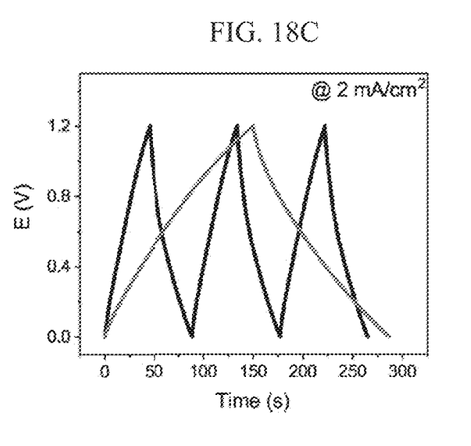
Figure 18D:
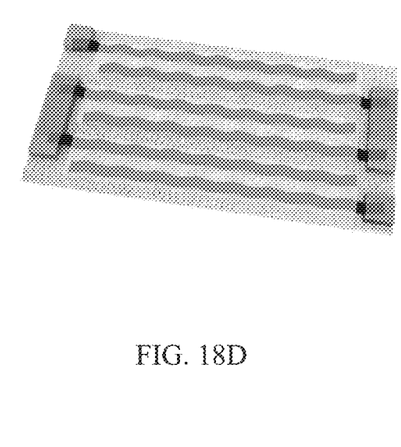
FIG. 18D is a schematic of carbon-metal oxide composite-based supercapacitors connected in series.

In fact, both in-plane and out-of-plane patterning is possible by exploiting the 3D printing capability of the fabrication method. The speed and position of the nozzle may be controlled in three dimensions, e.g., using a modified 3D printer frame, allowing the extruded structure to form two-dimensional patterns and/or thick or layered structures. For example, as shown in FIGS. 18A and 18D which are discussed below, a patterned array of composite electrodes can be directly deposited on a substrate to form supercapacitor units connected either in parallel, series, or a parallel-series hybrid configuration. In another example, for certain applications that may require thick electrodes, the desired thickness can be achieved by repeatedly injecting the carbon material solution into a coagulation solution at the same predetermined location multiple times. In this way, the extruded structures can grow out of the substrate plane in the vertical direction. Hence, thickness is also a parameter that can be controlled by the 3D additive printing process.

The liquid employed for the carbon material solution 102 may comprise water (e.g., de-ionized water) or an organic solvent, such as m-Cresol (3-methylphenol). The carbon material solution may further include a surfactant, such as sodium dodecyl sulfate, lithium dodecyl sulfate, and sodium cholate. Typically, the carbon source comprises carbon nanotubes (single wall and/or multi-wall carbon nanotubes), graphene, and/or reduced graphene oxide. A mass ratio of the carbon source to the surfactant in the carbon material solution may lie in a range from about 2:1 to about 1:10. Typically, a concentration of the carbon source in the carbon material solution is in a range from about 1 mg/ml to about 3 mg/ml.

The metal nitrate of the coagulation solution 104 may be selected from iron nitrate, manganese nitrate, nickel nitrate, and/or cobalt nitrate. In some cases, a metal chloride (e.g., iron chloride, manganese chloride, nickel chloride, and/or cobalt chloride) may be used. The metal oxide formed by thermal decomposition of the metal nitrate or chloride upon annealing may comprise iron oxide, manganese oxide, nickel oxide, and/or cobalt oxide. The organic solvent of the coagulation solution typically comprises isopropyl alcohol, ethanol and/or acetone.

Referring again to FIG. 1, the method may further include, prior to continuously injecting the carbon material solution 102 into the coagulation solution 104, preparing or synthesizing the carbon material solution 102. The preparation may entail combining the carbon source, the water, and the surfactant to form a mixture 110. Alternatively, an organic solvent may be employed in lieu of the water and surfactant, in which case the mixture 110 may be formed by combining the carbon source with the organic solvent. Typically the mixture 110 undergoes sonication to form the carbon material solution 102, although in some cases manual stirring or shaking may be sufficient. Sonication may utilize an ultrasonic bath and/or may entail tip (or probe) sonication. In a particular example, the mixture 110 may undergo an ultrasonic bath treatment for about 5 min to about 20 min, followed by tip sonication for about 10 min to about 120 min. Sonication of the mixture 110 may be followed by centrifuging, which may entail, in one example, spinning the mixture at 1000-5000 rpm for 15-75 minutes.

The method may also entail, prior to continuously injecting the carbon material solution 102 into the coagulation solution 104, preparing or synthesizing the coagulation solution 104. The preparation may entail mixing crystals comprising the metal nitrate or metal chloride with the organic solvent, which may be referred to as a coagulating solvent. The mixing may entail manual stirring or shaking, sonication, and/or centrifuging, as described above. Typically, the coagulation solution 104 includes the metal nitrate (or metal chloride) at a concentration in a range from about 0.01 mol/l to about 1 mol/l. As indicated above, references to a metal nitrate throughout this disclosure may be understood to encompass the metal nitrate and/or a metal chloride.

Figure 3:
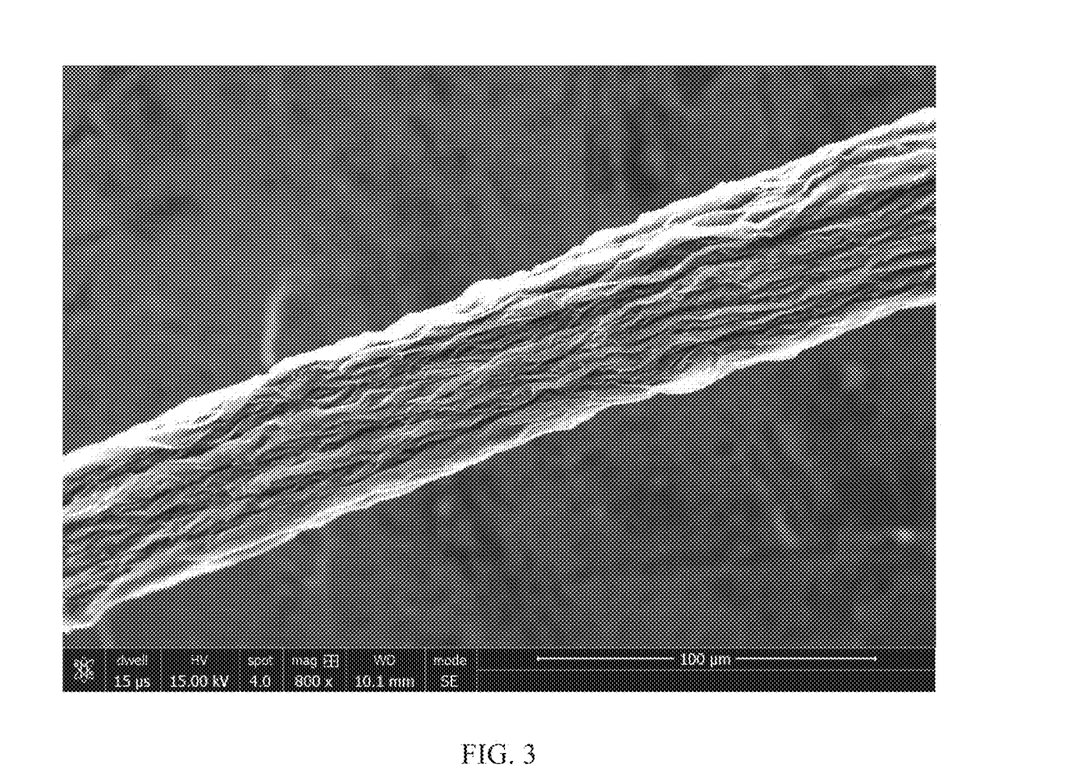
FIG. 3 is a scanning electron microscopy (SEM) image of an exemplary carbon-metal oxide composite structure (fiber) comprising carbon nanotubes (CNT) and manganese oxide.

Prior to annealing the extruded structure 106 to thermally decompose the metal nitrate to metal oxide, the extruded structure 106 may be removed from the coagulation solution 104. The annealing may take place in an argon atmosphere or other inert gas atmosphere, typically for at least about 60 minutes. The annealing may be carried out at a temperature in a range from about 100° C. to about 500° C. or, in some examples, from 150° C. to 300° C. As a consequence of the annealing, the composite structure 108 is formed from the extruded structure 106. FIG. 3 shows a scanning electron microscopy (SEM) image of an exemplary carbon-metal oxide composite structure in the shape of a fiber that comprises carbon nanotubes (CNTs) and uniformly dispersed manganese oxide. The scale bar is 100 microns.

Figure 4:
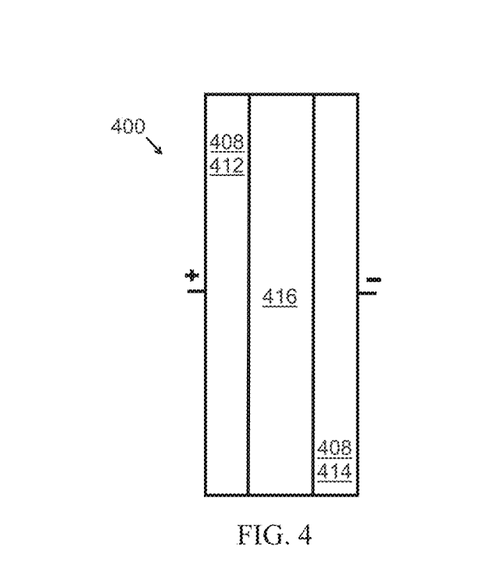
FIG. 4 is a schematic of an exemplary supercapacitor assembled from carbon-metal oxide composite electrode(s).
Figure 5A:
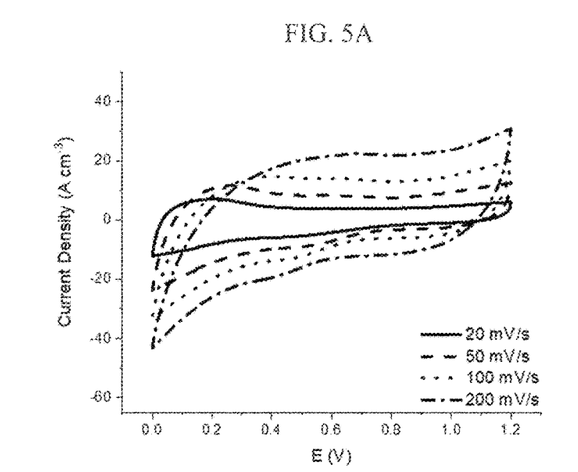
Figure 5B:
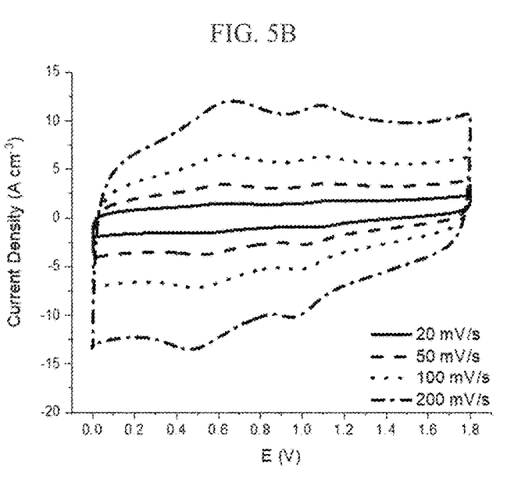
Figure 5C:
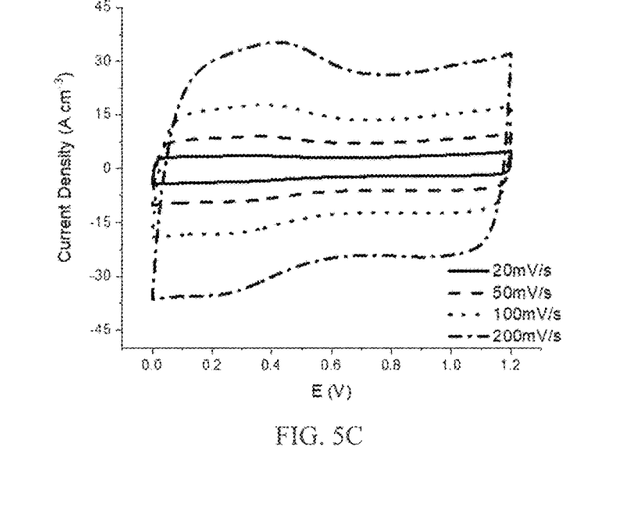
Figure 5D:
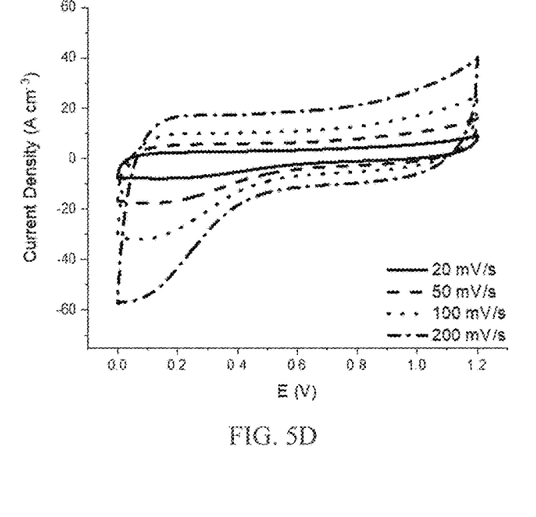

A carbon-metal oxide composite electrode 408 having a composite structure 108 including carbon and a metal oxide, where the metal oxide is uniformly dispersed within the composite structure 108 and which may be fabricated as described above, may be assembled to form a supercapacitor 400, as shown in the simple schematics of FIGS. 4 and 8 and as described below. The composite structure 108 of the carbon-metal oxide composite electrode 408 may have any of the characteristics and properties described above or elsewhere in this disclosure.

The supercapacitor 400 may comprise first and second electrodes 412,414 separated by a gel electrolyte 416, where at least one of the first and second electrodes 412,414 comprises the carbon-metal oxide composite electrode 408. The electrolyte 416 may comprise an alkaline electrolyte gel, a neutral electrolyte gel, or an acid electrolyte gel. The carbon-metal oxide composite electrode(s) may be formed on or transferred onto a substrate, which may advantageously be a flexible substrate, as discussed below. The supercapacitor 400 may exhibit an operation voltage window in a range from about 1.2 V to about 1.8 V. Various configurations of the supercapacitor 400 are possible. In one example, both of the first and second electrodes 412,414 may comprise the carbon-metal oxide composite electrode 408 in a symmetric two-electrode system, where the metal oxide of the first electrode 412 is the same as the metal oxide of the second electrode 414. In another example, both of the first and second electrodes 412,414 may comprise the carbon-metal oxide composite electrode 408 in an asymmetric two-electrode system, where the metal oxide of the first electrode 412 is different from the metal oxide of the second electrode 414.

Advantageously, the supercapacitor 400 may be flexible and/or stretchable. Bendable supercapacitors 400 may be fabricated by depositing or transferring the first and second electrodes 412,414 onto a flexible (e.g., polymeric) substrate 418. For example, the first and second electrodes 412,414 may be spaced apart on the polymeric substrate 418, such as polyethylene terephthalate (PET), and partly or completely covered by the gel electrolyte 416, as illustrated in FIG. 8. More specifically, the first and second electrodes in the form of fibers, ribbons and/or films may be placed in parallel on the substrate, and the gel electrolyte may be coated onto the substrate and over the first and second electrodes, followed by drying. In one example, the drying may be carried out in air for several hours at room temperature (~22-25° C.). The first and second electrodes 412,414 may each extend to an electrical contact 420, which may be formed by conductive paint. To prepare the gel electrolyte, a suitable acidic, alkaline or neutral electrolyte (e.g., KOH or $H_3PO_4$) may be added to a polyvinyl alcohol (PVA) aqueous solution (e.g., 10 wt. % PVA), followed by vigorous stirring or sonication.

Highly stretchable supercapacitors may be formed by incorporating a pre-strained polymeric substrate (e.g., an elastomeric polymer such as silicone rubber constrained under tension) into the coagulation solution for deposition and attachment of the extruded structure formed by continuous injection as described above. Multiple extruded structures may be deposited and attached to the substrate to serve as first and second electrodes of the supercapacitor to be fabricated. After removal from the coagulation solution and annealing as described above, first and second electrodes comprising a carbon-metal oxide composite structure may be obtained. The tension on the substrate may then be released, leading to contraction of the substrate and buckling of the first and second electrodes. As discussed below, the buckled first and second electrodes may be described as having a wavy structure that includes wrinkles or crumples. A gel electrolyte may be applied over the substrate and the first and second electrodes, and then dried (e.g., as described above), thereby forming a stretchable supercapacitor. An example of fabricating and testing a carbon nanotube-$MnO_2$ based stretchable supercapacitor is described below.

Electrochemical Measurements of Supercapacitors

Electrochemical properties of exemplary supercapacitors 400 are measured using a Bio-Logic VMP3 multi-channel potentiostat in a symmetric two-electrode system at room temperature. Two-electrode cyclic voltammetry (CV) and galvanostatic charge-discharge (GCD) measurements are carried over a voltage window of 0 to 1.2 V for the alkaline electrolyte gel and 0 to 1.8 V for the acid electrolyte gel. Rate dependent capacitances of the supercapacitor devices are calculated from the GCD profiles measured at different current densities. The volumetric capacitances are calculated based on the total electrode volume excluding the electrolyte.

Calculation of specific capacitance, power density and energy density: The specific capacitance of supercapacitor obtained through galvanostatic charge-discharge measurement can be estimated using the following equation:

$$C_x = 2It/VX$$

where a is specific capacitance (F cm$^{-3}$ or F g$^{-1}$). I is the current applied, t is the discharge time and V is the potential window.

The volumetric (gravimetric) power (P, in W cm$^{-3}$ or W g$^{-1}$) and energy (E, in Wh cm$^{-3}$ or Wh g$^{-1}$) are calculated using the following equation:

$$E_x = CV^2/2X, P_x = E_x/t$$

where X stands for volume (gravimetric) (unit in cm$^3$ or g) of electrodes, V is the voltage window, C is the measured capacitance, and t stands for the discharge time.

FIGS. 5A-5D show CV curves of carbon-metal oxide composite electrodes 408 in a symmetric two electrode system, as described above. Supercapacitors 400 formed from the composite electrodes 408 may exhibit high values of specific capacitance (e.g., up to about 670 F/cm$^3$) as well as energy density (e.g., up to about 33.8 mWh/cm$^3$) and power density (e.g., up to about 4.5 W/cm$^3$). These values of specific capacitance and energy density are at least one order of magnitude higher than those of current commercially available supercapacitor products.

Figure 6:
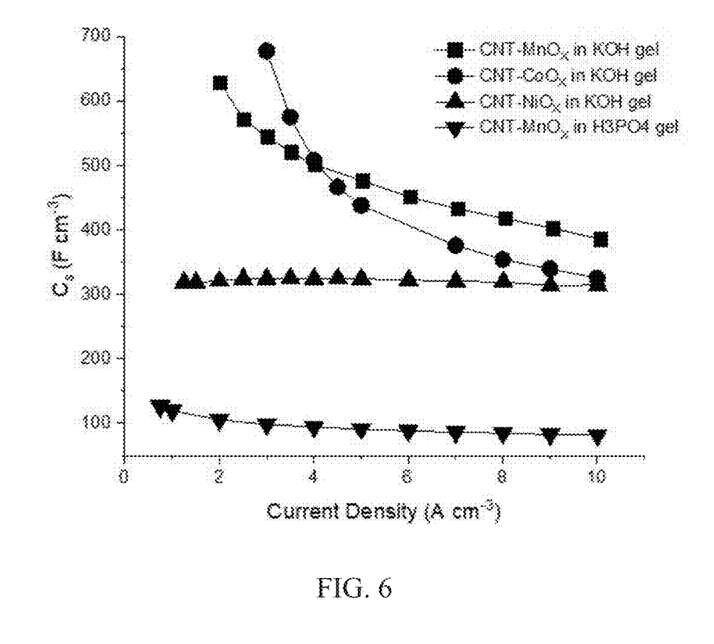
FIG. 6 shows specific capacitance for various carbon-metal oxide composite electrodes.

Exemplary specific capacitance data are shown in FIG. 6. In these examples, the composite electrodes have a composite structure comprising carbon nanotubes and a metal oxide (manganese oxide, cobalt oxide, or nickel oxide). Two different electrolyte gels, one alkaline and one acidic (KOH gel and H$_3$PO$_4$ gel, respectively) are used for the tests. As the data show, the specific capacitance of the supercapacitor may be at least about 100 F/cm$^3$ and preferably at least about 300 F/cm$^3$. In some examples, the specific capacitance may be as high as or higher than about 670 F/cm$^3$. Expressed differently, the supercapacitor may exhibit a specific capacitance of up to about 1048 F/g, such as at least about 156 F/g or preferably at least about 469 F/g; in some examples, the specific capacitance may be as high as or higher than about 1048 F/g.

Figure 7:
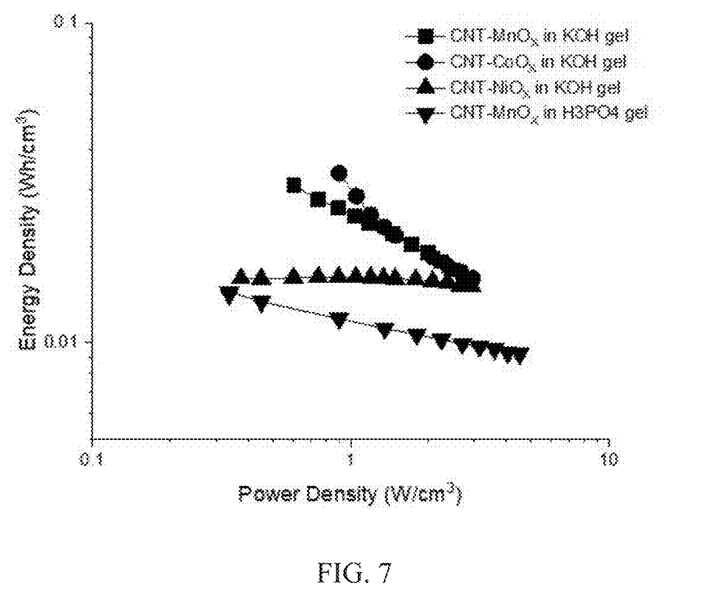
FIG. 7 shows energy density versus power density for various carbon-metal oxide composite electrodes.

Energy density is plotted versus power density in FIG. 7. As in FIG. 6, the exemplary composite electrodes have a composite structure comprising carbon nanotubes and a metal oxide (manganese oxide, cobalt oxide, or nickel oxide), and two different electrolyte gels, one alkaline and one acidic (KOH gel and H$_3$PO$_4$ gel, respectively) are used for the tests. As the data show, the energy density of the supercapacitor may be at least about 15 mWh/cm$^3$ and preferably at least about 20 mWh/cm$^3$. In some examples, the energy density may be as high as or higher than 33.8 mWh/cm$^3$. Expressed differently, supercapacitor may exhibit an energy density of at least about 23.5 mWh/g or preferably at least about 31.3 mWh/g. In some examples, the energy density may be as high as or higher than about 52.9 mWh/g. The power density may be at least about 0.7 W/cm$^3$ and preferably at least about 1 W/cm$^3$. In some examples, the power density may be as high as or higher than about 4.5 W/cm$^3$. Expressed differently, the power density may be at least about 1.1 W/g and preferably at least about 1.6 W/g. In some examples, the power density may be as high as or higher than about 7.0 W/g.

Fabrication and Testing of Stretchable Supercapacitors

Carbon-based materials, such as single-walled carbon nanotubes, graphene and activated carbon, are usually intrinsically elastic, which makes them being ideal building bricks for flexible and stretchable applications; however they suffer from relatively low capacity. On the other hand, metal oxides possess higher storage capacity, but are limited for use in flexible and stretchable supercapacitors because of poor electrical conductivity and intrinsic rigidity. The carbon-metal oxide composite electrodes described in this disclosure, which have a composite structure including carbon and a uniformly dispersed metal oxide, may achieve both good electrochemical and mechanical properties for stretchable supercapacitors.

Figure 9:
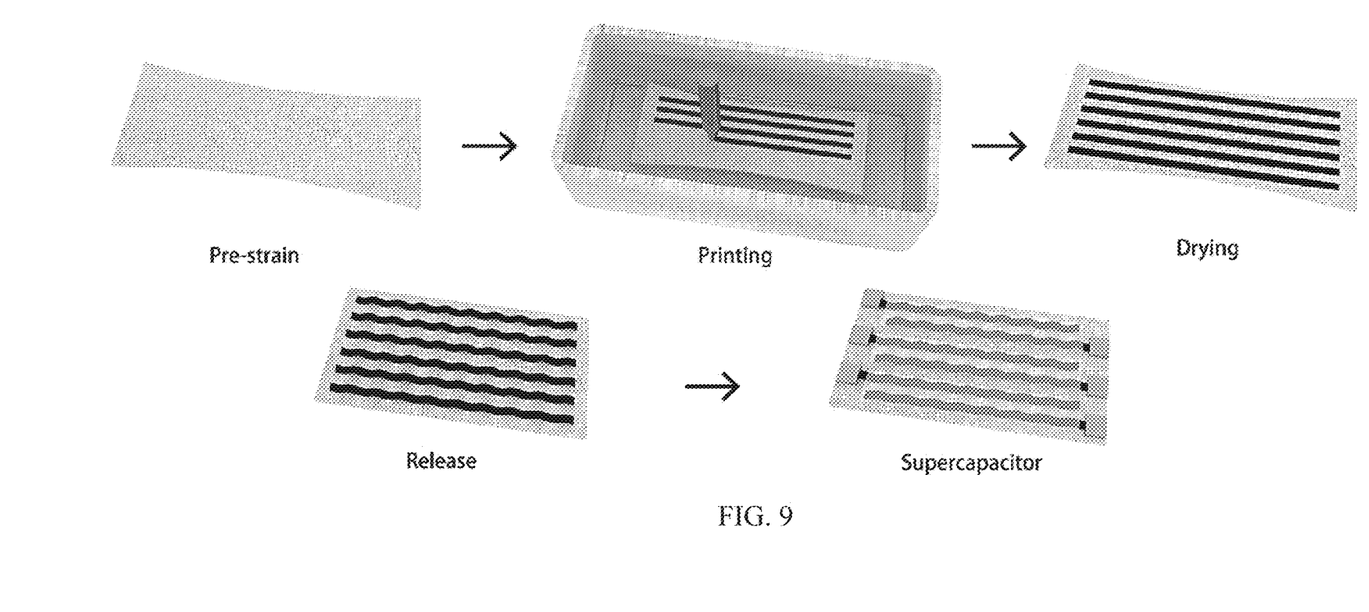
FIG. 9 is a schematic of an exemplary fabrication procedure for producing stretchable supercapacitors based on carbon-metal oxide composite electrodes.

In the exemplary process described below, single-wall carbon nanotubes (SWCNTs) and MnO$_2$ are combined through a solution method during the fiber spinning process to form a uniform distribution of MnO$_2$ in a carbon nanotube matrix. The fabrication process is schematically illustrated in FIG. 9. First, an elastomeric polymer (e.g., commercial Ecoflex 00-20 silicone rubber) may be cured in a mold, cut into a rectangular substrate, and pre-strained to 400% of its original length using a clamping rig. Before the printing procedure, a predetermined amount KMnO$_4$ may be added dropwise into the SWCNT aqueous dispersion solution that is dispersed with the help of surfactant to form SWCNT/KMnO$_4$ mixing solution. It should be noted that the selection of appropriate surfactant may be important for this step because KMnO$_4$ can react with the surfactant quickly due to its strong oxidizing property. In one example, sodium dodecyl sulfate (SDS) may be used as the surfactant to disperse the SWCNTs. Next, the obtained SWCNT/KMnO$_4$ solution may be ejected onto the pre-strained rubber in an ethanol bath through a flat-tipped needle. The ejecting syringe may be positioned using a modified 3D printer frame, enabling precise writing speed and line spacing between each thin film. The injection speed and needle size can also be adjusted to change the width of the film. During this step, MnO$_4^-$ is reduced to MnO$_2$, as can be observed as the purplish color in the ethanol bath gradually fades and brownish precipitates form (e.g., in about 30 minutes), producing the final SWCNT/MnO$_2$ composite electrodes. The obtained MnO$_2$ nanoparticles can be uniformly deposited in the composite film as the following redox reaction:

$$C_2H_6O + KMnO_4 \rightarrow C_2H_4O + MnO_2 + KOH + H_2O$$

It should be noted that the fabrication process illustrated in the flow chart of FIG. 2 and described above may alternatively be used to prepare the SWCNT/MnO$_2$ composite structure.

When the printing process is completed, the SWCNT/MnO$_2$ composite structure may be transferred out of the ethanol bath to dry in air for a few hours. After the solvent has evaporated thoroughly, the pre-strain may be released to relax the substrate back to its original size. The SWCNT/MnO$_2$ array buckles to form a wavy or crumpled structure upon releasing. Finally, a gel electrolyte (e.g., PVA/LiCl) may be deposited on the array to form the final supercapacitor device.

Figure 10:
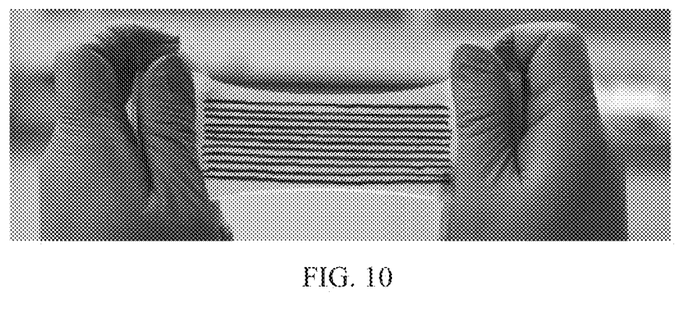
FIG. 10 shows a photograph of carbon-metal oxide composite structures formed on an elastomeric substrate as shown in FIG. 9 being stretched by hand.

FIG. 10 shows a photograph of the SWCNT/MnO$_2$ array being stretched by hand, indicative of the remarkable flexibility, elasticity, and ease of handling of these films. While fully stretched, the composite film exhibits a smooth surface without wrinkles. After releasing, the fabricated film returns to a wavy texture because of the structure buckling.

Figure 11:
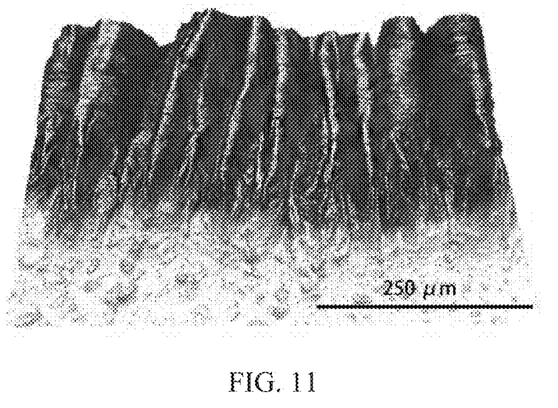
FIG. 11 shows a high-magnification 3D optical micrograph of a buckled carbon-metal oxide composite structure (in this example, a SWCNT-MnO$_2$ composite film) after strain releasing.

The surface morphology and topography of the strain-released film were investigated using a laser scanning confocal microscope to characterize its wave-like structure. FIG. 11 shows a close-up of wave-like wrinkles of the buckled composite film. The wavy texture of the SWCNT/MnO$_2$ composite film enables applications in ultra-stretchable energy storage.

Figure 12:
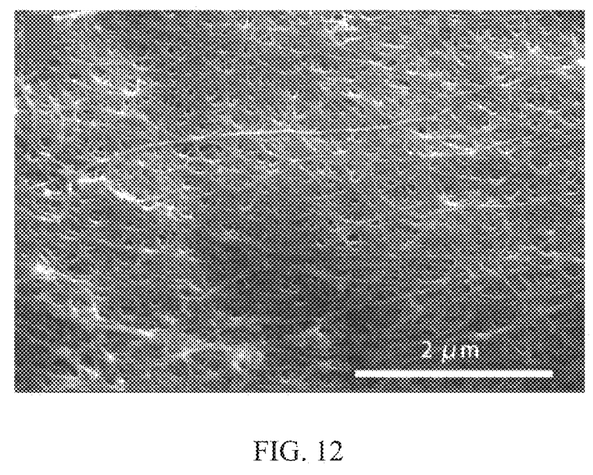
FIG. 12 shows a high-magnification scanning electron microscope (SEM) image of a SWCNT-MnO$_2$ composite film.
Figure 13:
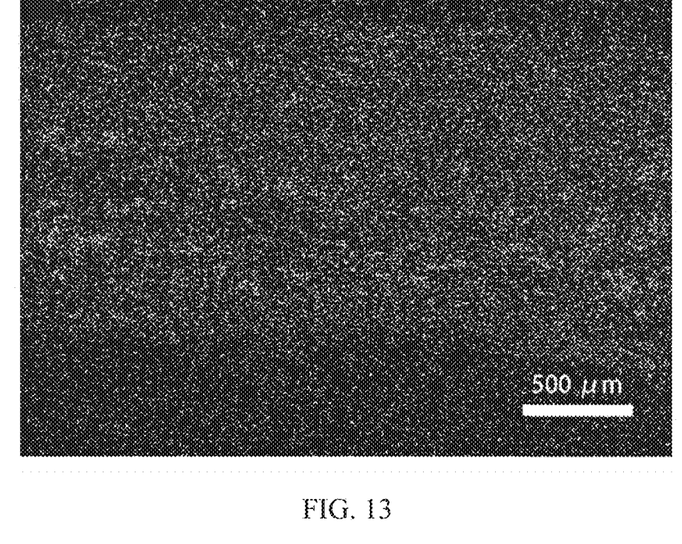
FIG. 13 shows an energy dispersive x-ray spectroscopy (EDS) map of Mn distribution in the SWCNT-MnO$_2$ composite film.

The morphology and elemental composition of the composite film are characterized by scanning electron microscopy (SEM) and energy dispersive x-ray spectroscopy (EDS). The SWCNT/MnO$_2$ composite film is removed from the substrate prior to characterization to avoid charging effects in the microscope.

FIG. 12 shows a high-magnification SEM image of a SWCNT/MnO$_2$ film that has a typical width of 1.4 mm. The image reveals the porous structure of the film, with no apparent MnO$_2$ crystals, suggesting that MnO$_2$ is uniformly distributed within the SWCNT matrix. This is corroborated by the EDS map shown in FIG. 13, which demonstrates a homogeneous distribution of manganese throughout the composite film, where the carbon appears as the dark background.

Figure 14:
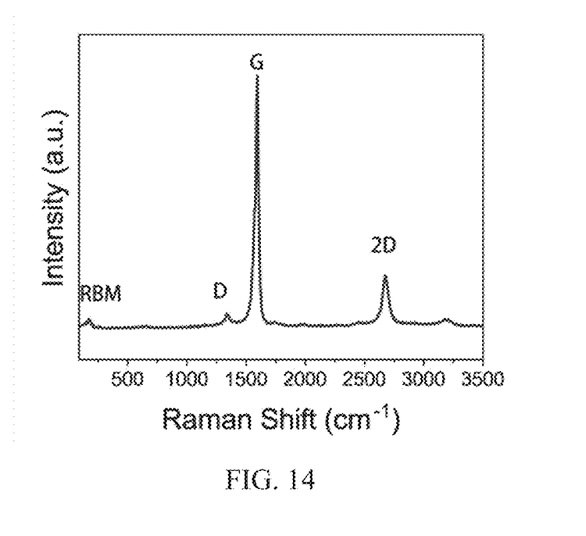
FIG. 14 shows a Raman spectrum of the SWCNT-MnO$_2$ composite film.

Raman spectroscopy was also performed for elemental and structure analysis. Four characteristic peaks of SWCNTs are clearly observed and marked as RBM (radial breathing mode), D, G and 2D peaks in FIG. 14. The G peak indicates crystallinity of SWCNTs while the D peak is attributed to the defects, leading to the standard practice of characterizing SWCNT quality using the ratio of the D and G peak intensities ($I_D/I_G$). It should be noted that the near invisibility of MnO$_2$ peaks in FIG. 14 is a consequence of their superposition with the signal from the SWCNTs, confirming the homogeneous distribution of MnO$_2$ in the carbonaceous matrix, which is beneficial for the electrochemical properties of SWCNT/MnO$_2$.

Figure 8:
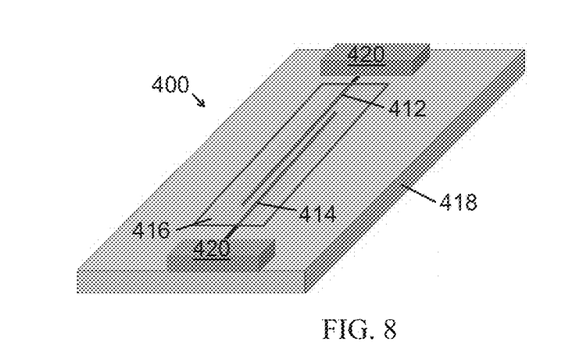
FIG. 8 is a schematic of an exemplary supercapacitor assembled from carbon-metal oxide composite electrodes on a substrate (e.g., a flexible substrate).

The SWCNT/MnO$_2$ supercapacitor devices, with adjacent lines of first and second (positive and negative) electrodes, as illustrated in FIGS. 8 and 9, have been analyzed to assess their electrochemical performance. A symmetric structure of supercapacitor which utilizes the fabricated SWCNT/MnO$_2$ for both positive and negative electrodes is constructed by coating the polymeric substrate and the electrodes with a gel electrolyte (in this example, PVA/LiCl gel). The results are compared to pure SWCNT devices, which are produced by an analogous procedure to that used for SWCNT/MnO$_2$ devices. Because these stretchable supercapacitors have wavy structures that include wrinkles or crumples, it is not straightforward to estimate their surface area and volume; consequently, the electrochemical performance is characterized in terms of per centimeter squared (instead of per centimeter cubed, as above).

Figure 15A:
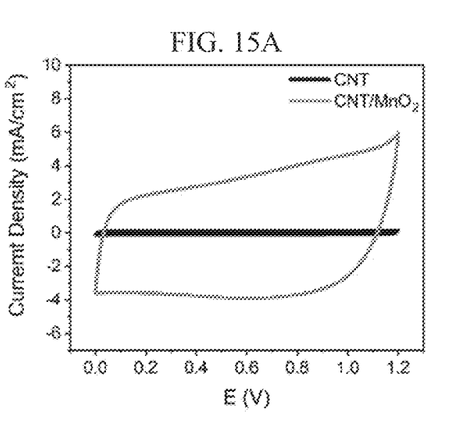
FIGS. 15A-15F show the electrochemical performance of a SWCNT/MnO$_2$-based supercapacitor in comparison with a SWCNT-based supercapacitor.

FIG. 15A depicts the cyclic voltammetry (CV) curves of SWCNT/MnO$_2$ and pure SWCNT devices measured at a scan rate of 50 mV/s. The SWCNT/MnO$_2$ supercapacitor device operates at a significantly higher current density, which is attributed to the pseudo-capacitive contribution from the MnO$_2$ in the composite film. The huge difference of CV curves indicates the significant improvement of electrochemical performance of SWCNT/MnO$_2$ compared to pure CNT film.

Figure 15B:
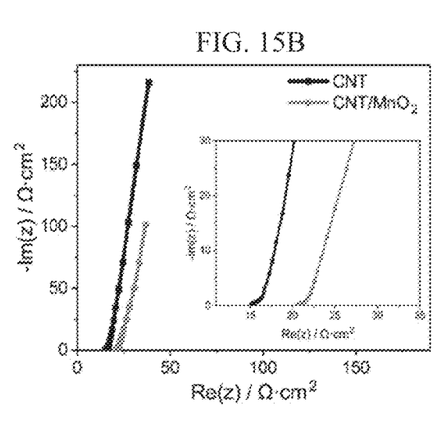
Figure 15C:
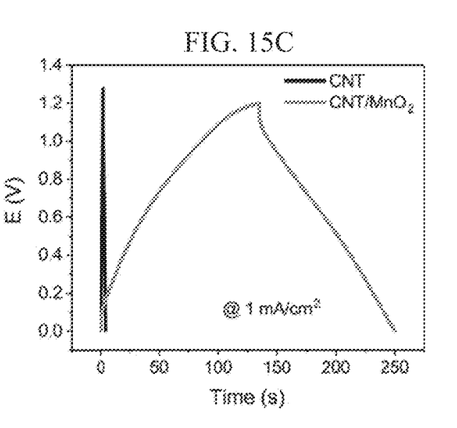
Figure 15D:
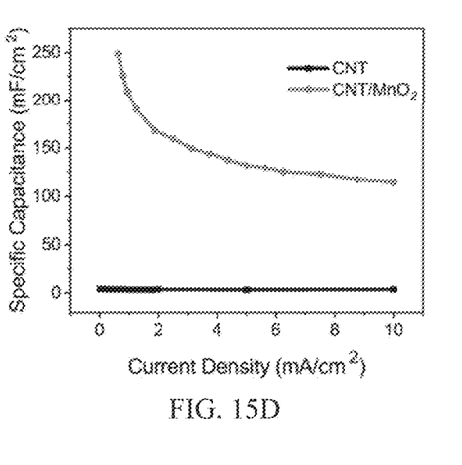
Figure 15E:
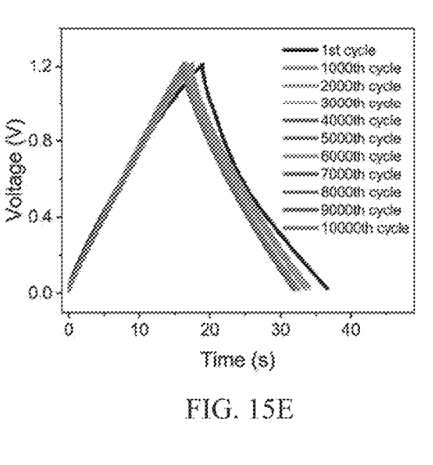
Figure 15F:
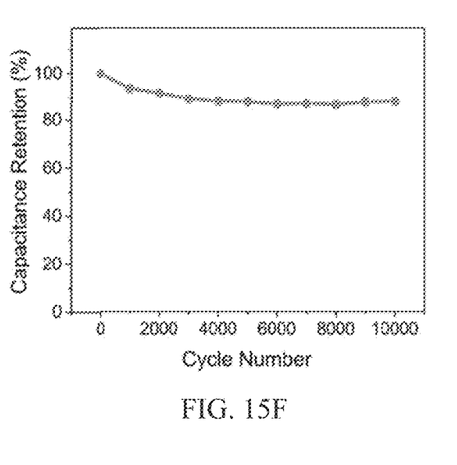

Electrochemical impedance spectroscopy (EIS) has also been performed and Nyquist plots in the range of 100 kHz to 100 mHz are shown in FIG. 15B. Both SWCNT/MnO$_2$ and SWCNT devices exhibit a nearly straight line parallel to the imaginary axis in their Nyquist plots, indicating almost ideal capacitive behavior. The FIG. 15B inset displays a close-up of the high-frequency behavior, implying a higher equivalent series resistance (ESR) of the SWCNT/MnO$_2$ device than for the pure SWCNT device, which can be attributed to the low conductivity of MnO$_2$. FIG. 15C demonstrates the galvanostatic charge/discharge (GCD) profiles for SWCNT/MnO$_2$ and SWCNT supercapacitors at a current density of 1 mA/cm$^2$. The large time delay between the charging times of these two devices is further evidence of the remarkable enhancement in the capacitance of the SWCNT/MnO$_2$ composites. The areal capacitances of SWCNT/MnO$_2$ and pure SWCNT supercapacitors at various current densities as calculated from their GCD profiles are shown in FIG. 15D. SWCNT/MnO$_2$ has an areal capacitance of 249 mF/cm$^2$ at a current density of 0.6 mA/cm$^2$, which is 67 times higher than the 3.7 mF/cm$^2$ exhibited by pure SWCNT supercapacitors at the same current density. In addition, the as-prepared SWCNT/MnO$_2$ supercapacitor still maintains 132 and 115 mF/cm$^2$ at high current densities of 5 and 10 mA/cm$^2$, respectively. The electrochemical stability has also been characterized by measuring these devices after repeated charge/discharge cycles. FIG. 15E shows various GCD profiles of a SWCNT/MnO$_2$ supercapacitor at intervals of 1000 cycles while FIG. 15F exhibits quantitative data for the capacitance retention after cycling. The as-prepared SWCNT/MnO$_2$ supercapacitor device still retains above 88% of its capacitance after 10000 charge-discharge cycles, indicative of superior long-term electrochemical stability.

Figure 16A:
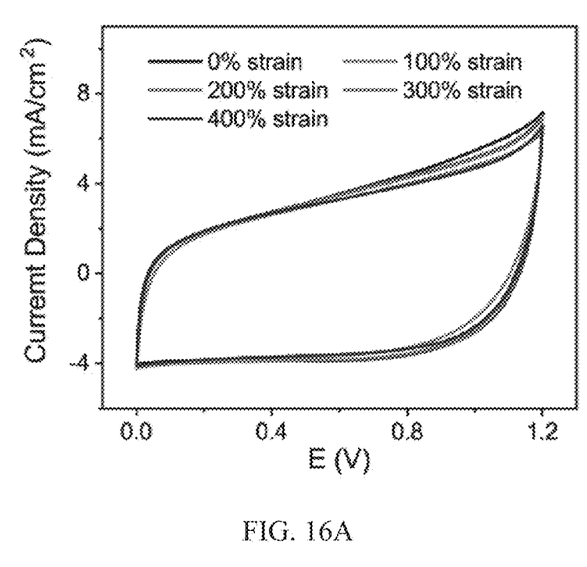
FIGS. 16A and 16B show the electrochemical performance of the SWCNT/MnO$_2$-based supercapacitor measured under static mechanical strains ranging from 0 to 400%.
Figure 16B:
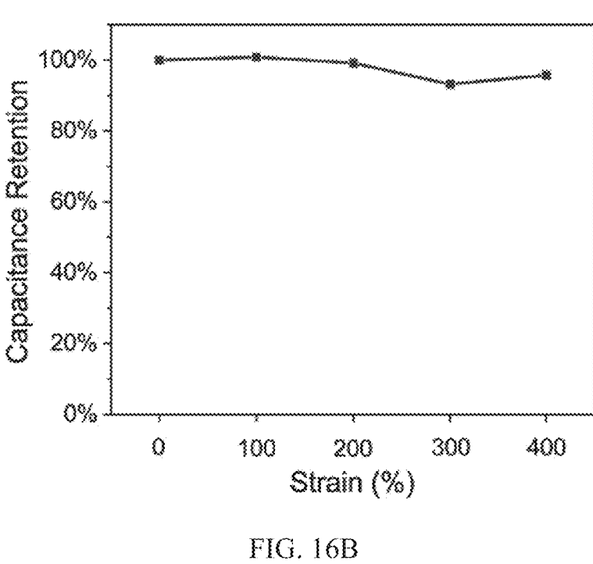

The performance of the SWCNT/MnO$_2$ supercapacitors has been evaluated under static mechanical deformation to assess their viability in wearable electronics applications. Owing to the wavy structure of fabricated SWCNT/MnO$_2$ together with the elastomeric rubber substrate, the as-prepared supercapacitor has an outstanding stretching capability, elongating up to 400%. In order to evaluate the effect of static mechanical deformation on the electrochemical properties of as-prepared SWCNT/MnO$_2$, supercapacitor performance under different strain levels is examined. FIG. 16A shows little to no visible changes in the CV curves measured at a scan rate of 50 mV/s under strains ranging from 0 and 400%, indicating excellent stretchability. This is corroborated by the linearity of Nyquist plots in the range of 100 kHz to 0.1 Hz. In addition, FIG. 16B shows that the specific capacitance varies by less than 5% under various mechanical stretching deformation up to 400%. These results constitute almost the highest stretching capability and capacitance retention reported to date. Even under extreme mechanical deformation, the energy density of the ultra-stretchable SWCNT/MnO$_2$ supercapacitor may be 4.2-12.4 µWh/cm$^2$.

Figure 17A:
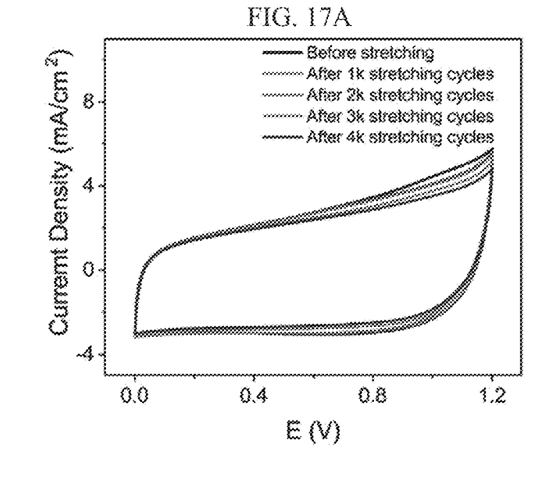
FIGS. 17A-17D show the electrochemical properties of the SWCNT/MnO$_2$-based supercapacitor measured after cycles of dynamic mechanical stretching.
Figure 17B:
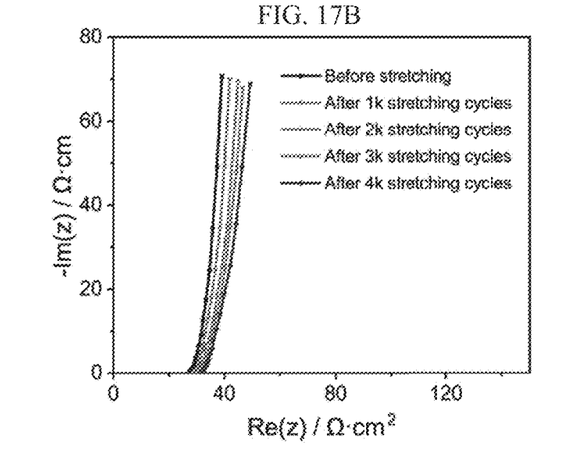
Figure 17C:
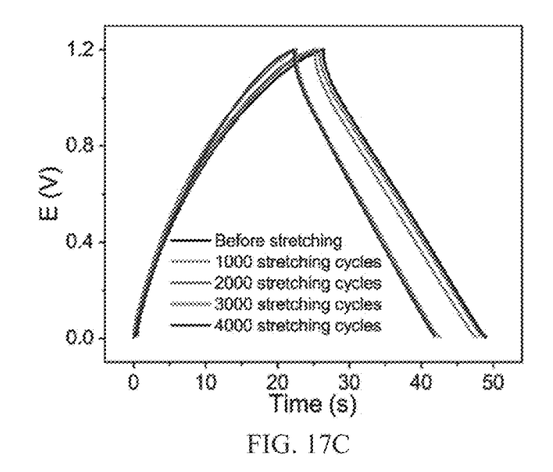
Figure 17D:
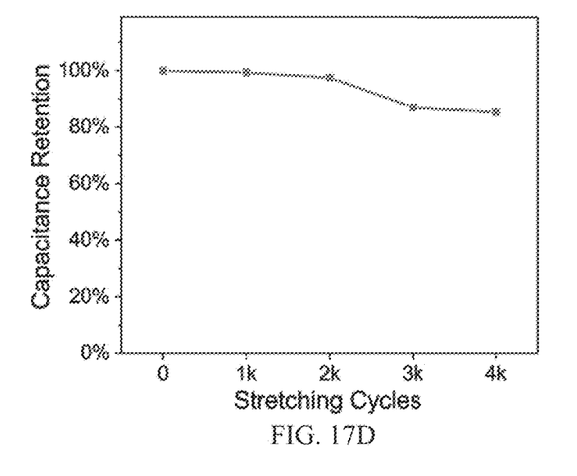

The electrochemical properties of the SWCNT/MnO$_2$ capacitors have been further quantified after repeated stretching cycles which simulate the mechanical wear expected in a real consumer device. The stretching cycles have been carried out using a programmable linear stage consisting of a ballnut, ballscrew, stepper motor, driver board, and Arduino microcontroller. Each mechanical stretching cycle includes a complete process which starts from 0% strain, then stretches to a maximum strain of 400% and finally restores to 0% strain. According to FIGS. 17A and 17B, CV curves measured at a scan rate of 50 mV/s and Nyquist plots in the range of 100 kHz to 100 mHz show only modest changes in the specific capacitance, frequency-dependent capacitive behavior and equivalent series resistance as a function of stretching cycles. The GCD profiles shown in FIG. 17C exhibit durability of the device during the long cyclical mechanical stretching process. FIG. 17D shows that the device retains over 85% of its original specific capacitance even after 4000 stretching cycles, confirming the stability of the as-prepared SWCNT/MnO$_2$ supercapacitor after extensive mechanical cycling.

Figure 18E:
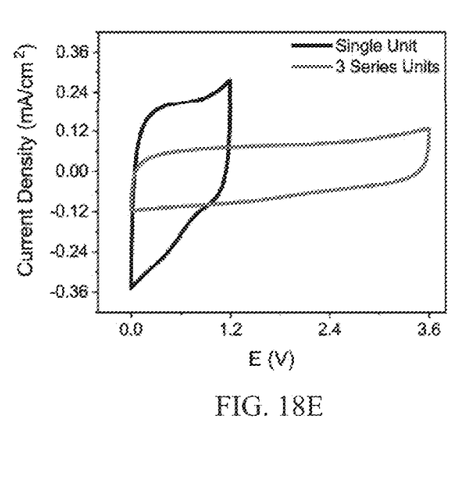
FIGS. 18E and 18F show CV curves and GCD curves, respectively, for three SWCNT/MnO$_2$-based supercapacitor units connected in series.
Figure 18F:
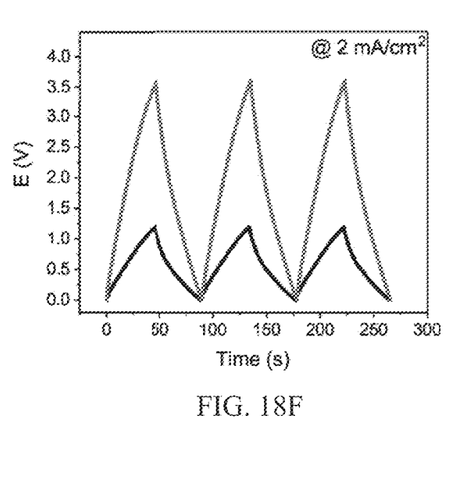

In practical applications, energy storage cells are usually connected either in parallel, series, or a parallel-series hybrid configuration. The integration of three SWCNT/MnO$_2$ supercapacitor units connected in parallel and in series are explored to increase capacitance or operation voltage of the devices, as illustrated in FIGS. 18A and 18D. The CV and GCD curves in FIGS. 18B and 18C confirm that three supercapacitor units connected in parallel increase the output current and discharge time of the overall device by a factor of 3 compared to a single unit operating with the same voltage window. Similarly, the CV and GCD curves for the series connected supercapacitor device, FIGS. 18E and 18F, show that the voltage window of the overall device has increased from 1.2 V of single unit to 3.6 V with almost the same charge-discharge time.

To summarize, the fabrication method described in this disclosure results in a uniform distribution of MnO$_2$ throughout the SWCNT matrix. As a result, the as-prepared SWCNT/MnO$_2$ supercapacitors achieve a combination of excellent electrochemical properties while exhibiting mechanical flexibility and stretchability. The ultra-stretchable supercapacitors have an extraordinarily high areal capacitance of 249 mF/cm$^2$ and outstanding electrochemical stability after 10000 charge-discharge cycles. Under static tensile strain and dynamic stretch-release cycling, the ultra-stretchable supercapacitors exhibit only 5% capacitance difference with static strain deformation up to 400%. After long-term mechanically stretch-release cycling (up to 4000 cycles), the as-prepared supercapacitors still sustain 85% of their initial capacitance. Their exceptional flexibility and energy storage properties make these devices well-suited for integration into wearable electronics.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A stretchable supercapacitor comprising:
   first and second electrodes spaced apart on a substrate comprising an elastomeric polymer, wherein at least one of the first and second electrodes comprises a carbon-metal oxide composite electrode having a composite structure including carbon nanotubes and a metal oxide comprising manganese oxide, the metal oxide being uniformly dispersed within the composite structure;
   a gel electrolyte applied over the first and second electrodes and the substrate, the gel electrolyte comprising polyvinyl alcohol (PVA); and
   an operating voltage window in a range from 1.2 V to 1.8 V,
   wherein the first and second electrodes have a buckled structure formed upon release of tensile strain in the substrate during fabrication.

2. The stretchable supercapacitor of claim 1, wherein both of the first and second electrodes comprise the carbon-metal oxide composite electrode in a symmetric two-electrode system, the metal oxide of the first electrode being the same as the metal oxide of the second electrode.

3. The stretchable supercapacitor of claim 1, exhibiting a specific capacitance of at least about 300 F/cm$^3$, an energy density of at least about 20 mWh/cm$^3$, and/or a power density of at least about 1 W/cm$^3$.

4. The stretchable supercapacitor of claim 1, wherein the first and second electrodes are in an asymmetric two-electrode system,
   wherein the first electrodes comprises the carbon-metal oxide composite electrode having the metal oxide comprising manganese oxide,
   wherein the second electrode comprises a carbon-metal oxide composite having a different metal oxide than the metal oxide comprising manganese oxide of the first electrode.

5. The stretchable supercapacitor of claim 1, wherein the metal oxide takes the form of nanocrystals and/or is atomically distributed within the carbon.

* * * * *

UNITED STATES PATENT AND TRADEMARK OFFICE
CERTIFICATE OF CORRECTION

PATENT NO. : 11,923,140 B2
APPLICATION NO. : 17/224450
DATED : March 5, 2024
INVENTOR(S) : Gang Wang, Yaofeng Chen and Joseph W. Lyding It is certified that error appears in the above-identified patent and that said Letters Patent is hereby corrected as shown below:

In the Specification

Column 7, Line 10, delete "a" and replace with --$C_x$--

Column 7, in the equation between Lines 15 and 20, delete "$E_x=CV^2/2X, P_x=E_x/t$" and replace with --$E_x=CV^2/2X, P_x=E_x/t$--

In the Claims

Column 12, Claim 4, Line 33, delete "electrodes" and replace with --electrode--

Signed and Sealed this
Thirtieth Day of April, 2024

Katherine Kelly Vidal
*Director of the United States Patent and Trademark Office*